(12) United States Patent
Isola et al.

(10) Patent No.: US 9,437,027 B2
(45) Date of Patent: Sep. 6, 2016

(54) LAYERED IMAGE UNDERSTANDING

(71) Applicant: Microsoft Corporation, Redmond, WA (US)

(72) Inventors: Phillip John Isola, Cambridge, MA (US); Ce Liu, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 302 days.

(21) Appl. No.: 13/908,990

(22) Filed: Jun. 3, 2013

(65) Prior Publication Data

US 2014/0354693 A1    Dec. 4, 2014

(51) Int. Cl.
*G06T 11/60*    (2006.01)
*G06T 19/20*    (2011.01)

(52) U.S. Cl.
CPC .............. *G06T 11/60* (2013.01); *G06T 19/20* (2013.01); *G06T 2219/2004* (2013.01)

(58) Field of Classification Search
None
See application file for complete search history.

(56) References Cited

PUBLICATIONS

Lai, Kevin, and Dieter Fox. "Object recognition in 3D point clouds using web data and domain adaptation." The International Journal of Robotics Research 29.8 (2010): 1019-1037.*
Nan, Liangliang, Ke Xie, and Andrei Sharf. "A search-classify approach for cluttered indoor scene understanding." ACM Transactions on Graphics (TOG) 31.6 (2012): 137:1-10.*
Fisher, Matthew, and Pat Hanrahan. "Context-based search for 3D models." ACM Transactions on Graphics (TOG). vol. 29. No. 6. ACM, 2010.*
Sinha, Sudipta N., et al. "Interactive 3D architectural modeling from unordered photo collections." ACM Transactions on Graphics (TOG). vol. 27. No. 5. ACM, 2008.*
Snavely, Noah, et al. "Scene reconstruction and visualization from community photo collections." Proceedings of the IEEE 98.8 (2010): 1370-1390.*
Gupta, Abhinav, Alexei A. Efros, and Martial Hebert. "Blocks world revisited: Image understanding using qualitative geometry and mechanics." Computer Vision—ECCV 2010. Springer Berlin Heidelberg, 2010. 482-496.*

* cited by examiner

*Primary Examiner* — Daniel Hajnik
(74) *Attorney, Agent, or Firm* — Alin Corie; Sandy Swain; Micky Minhas (57) ABSTRACT

The subject disclosure is directed towards layered image understanding by which a layered scene representation is generated for an image. Providing such a scene representation explains a scene being presenting in the image by defining that scene's semantic structure. To generate the layered scene representation, the subject disclosure recognizes objects within the image by combining objects sampled from annotated image data and determining whether that combination is both semantically well-formed and matches the visual appearance of the image. The objects are transformed and then can be used to modify the query image. The subject disclosure models the objects into semantic segments that form a portion of the scene representation.

20 Claims, 8 Drawing Sheets

LAYERED IMAGE UNDERSTANDING

BACKGROUND

Image understanding systems employ various techniques, including those in the field of computer vision, to understand image and/or video data. These techniques tend to imitate human visual recognition mechanisms. For example, when viewing a scene, such as a cityscape, a forest or a cafeteria, humans often decompose that scene into a richly organized interaction of objects, functions, spaces and/or the like. Image understanding systems attempt to do the same, with some success to an extent. Nonetheless, parsing an image into a set of objects and interactions remains a difficult and costly undertaking for image understanding systems.

Many current approaches represent an image as a two-dimensional array of pixel labels, which fail to account for occlusion. This means portions of a scene's semantic structure are occluded from view. Occlusion renders visible content difficult to parse. For example, when projected into a two-dimensional image, background objects are often fragmented by occluding objects in the foreground. A number of image understanding techniques attempt to address the problem of understanding images with multiple overlapping portions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards layered image understanding in which an image is partitioned into overlapping layers. The image is parsed into a set of objects, which when assigned to appropriate layers, describe a scene's semantic structure. Each object may be assigned to a distinct layer in order to resolve occluded content for the semantic structure.

One aspect of layered image understanding is the use of polygon-base labeling. Each object may be modeled as a polygon having a specific position and/or depth in the image. Knowing relative depths between objects allows modeling of an image that may be substantially error-proof, compact and/or perceptually three-dimensional.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards parsing an image into a set of objects representing a scene's semantic structure by combining sample objects retrieved from sample images. These images may be annotated with depth and object information and stored in a dictionary, according to one example implementation. The set of objects may be layered according to an appropriate depth and/or position in a mechanism herein referred to as a scene representation.

An image understanding mechanism may be configured to generate a synthesized image and a corresponding scene representation by layering and/or transforming objects sampled from the sample images. The corresponding scene representation models a query image's scene as a group or collage of such objects in which each object may be related to other objects by support constraints.

Starting with an annotated data network of example neighboring scenes, one example implementation of the image understanding mechanism interpolates portions of the query image's scene by recombining and/or transforming image data from at least some of the neighboring scenes into the synthesized scene. Each scene modification step/move accesses a current iteration of the synthesized image and restructures a portion to increase semantic similarity with one of the example scenes. As described herein, the image understanding mechanism iteratively considers one valid move at a time (e.g., add an object, translate the object, add other objects and so forth). After executing a set of valid scene modification moves, the image understanding mechanism interpolates toward the scene representation rendering the synthesized scene that is semantically similar to the scene of the query image.

In this manner, the image understanding mechanism navigates a scene space by interpolating between a present iteration and the example scenes in order to produce the layered scene representation. The concept of using the layered scene representation for image parsing may enable resolution of occluded content (objects) in scenes. Furthermore, the layered scene representation may be manipulated via a user interface.

Some scene modification moves preserve the scene's semantic structure. Therefore, after executing such a scene modification move, if the image understanding mechanism reconstructed the scene representation from the resulting synthesized image, the scene's semantic structure is unchanged. For example, if the scene representation specifies that a car is supported by a road, that car, even after a transformation, remains supported by the road. Hence, the scene representation provides local context for each object. Structure preserving moves include transforming objects and swapping one object for another object from an example scene. Other scene modification moves change the scene's semantic structure by adding objects from an example scene and/or removing objects from the scene representation, which may improve semantic similarity between the resulting synthesized image and the example scene.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and image understanding in general.

Figure 1:
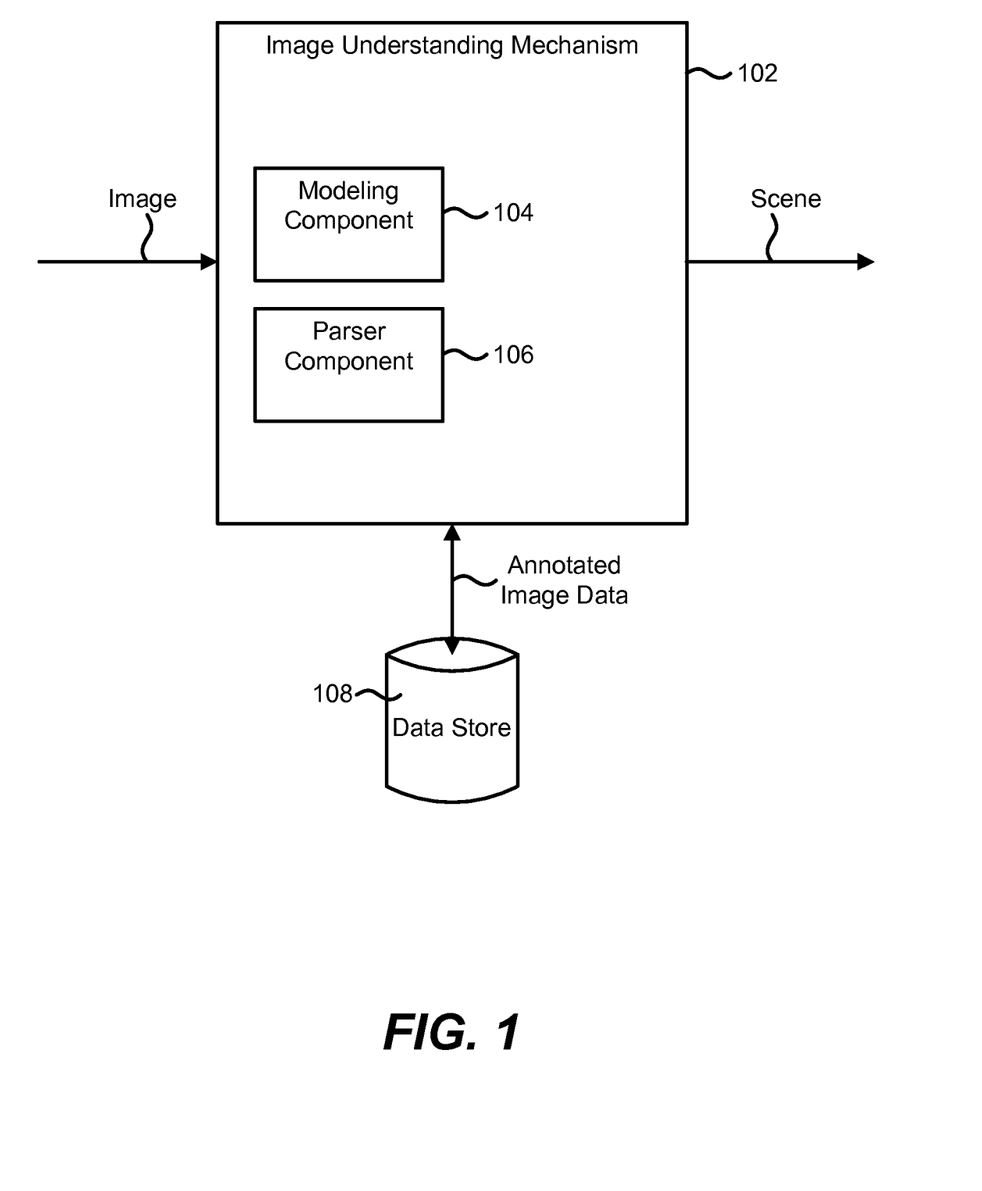
FIG. 1 is a block diagram illustrating an example system for layered image understanding according to one example implementation.

FIG. 1 is a block diagram illustrating an example system for layered image understanding according to one example implementation. The example system may include an image understanding mechanism 102 comprising a modeling component 104 and a parser component 106 that is coupled to a data store 108 for maintaining various image data, including annotated image data. The modeling component 104 may be configured to transform the image data into annotated image data that models scene context, object context within scenes and/or object similarity. As described herein, such model data enables layered image understanding for defining a scene's semantic structure. It is appreciated that a number of applicable mechanisms for representing the scene's semantic structure and any such mechanism may herein be referred to as the scene's representation or, simply, a scene representation.

Layered image understanding, generally, involves producing a layered scene representation by manipulating image data stored within the data store 108. Unlike other approaches to sample-based scene parsing, the parsing component 106 performs a generative process that combines random portions of scenes from different sample images. In addition, the parsing component 106 may modify the image data through a set of transformations. The parsing component 106 invokes various transformations/scene modifications over a set of random initialization conditions and selects the layered scene representation that maximizes an objective, such as maximum pixel coverage, minimum feature matching error and/or the like.

Configuring geometric relationships between objects, such as occlusion and depth ordering, into the scene representation constitutes one example differentiator with conventional pixel-based or over-segmentation based scene parsing models. The scene's representation can be extended into a full three-dimensional (3D) scene model. Furthermore, the parsing component 106 provides an interface enabling users to manipulate the layered scene representation of semantic segments through translating and/or scaling individual object polygons and/or moving individual control points.

The parsing component 106 retrieves the annotated image data from the data store 108 while searching a set of sample images for valid objects that fit the scene expressed by the query image. A "scenegraph" represents one example graph describing object context/interrelations within a given image. One example implementation of the annotated image data provides scene-level context in the form of a scene network comprising neighboring sample images having semantically similar scenes. Another data network comprises an object network of related objects in a particular class. The object network may be configured to facilitate navigation through a space comprising visually similar objects.

According to one example implementation, the image data in the data store 108 also includes an appearance model for each sample object's corresponding sub-region in a sample image. One example appearance model for a sample object includes an image feature distribution for that object's corresponding sub-region. The corresponding sub-region may include a polygon, such as a regular or irregular polygon, sufficient in volume to encompass at least a portion of the sample object.

To estimate support constraints/relationships for that sample object, the modeling component 104 implements the following heuristic function: a first object supports a second object if the first object is on a higher layer than the second object and the second object is the predominant object in a space directly below the first object, for example, according to the y-coordinate. These object relationships may be useful for inferring semantic structure in unlabeled query images.

The parsing component 106 invokes the modeling component 104 to model an example query image's scene as a collection of semantic segments corresponding to potentially transformed objects selected from sample images. Each semantic segment, therefore, may include a labeled transformed object retrieved from the data store 108. Each segment comprises the object's class, a geometric mask specifying the object's outline, and image pixels. Semantic segments provide relationships between objects and add context structure to the scene representation.

Using the sample object's transformation settings, one example implementation of the parsing component 106 modifies the sample object's image feature distribution in order to generate the scene's transformed object. To accomplish such a transformation, the parsing component may employ any combination of the following manipulations: translation, scaling, layering, trimming, in-painting and/or the like. In addition to a set of transformed objects and transformation settings, the scene representation includes a set of relationships that provide context for each object (e.g., semantic relationships between objects).

The parsing component 106 may be configured to generate a synthesized image using a scene's semantic structure (e.g., a scenegraph) by, initially, modeling each object's appearance in that scene. For example, an object x corresponds to a function g denoting a generative appearance model. The object x is modeled as a distribution of expected image features within different sub-regions of the object's mask. Rather than modeling the appearance of raw pixels, the distribution models an appearance of image features and/or other data.

One example implementation of the parsing component 106 proceeds to select an appropriate scene modification operation/move towards a nearest neighbor scene, which includes adding an object to or removing an object from a scene's semantic structure (e.g., as represented by a scenegraph). After identifying a sample object to add, for example, the parsing component 106 determines a depth layer and/or a position at which the sample object is inserted into the scene. The parsing component 106 accordingly translates and/or scales image data associated with the sample object.

Based upon support constraints, the parsing component 106 may connect the sample object to other objects modeled as semantic segments in the scene representation. For example, the parsing component 106 may insert the sample object as a semantic segment that supports another segment and/or is supported by another segment. The parsing component 106 generates an updated synthesized image in which the sample object may be placed at any position not in violation of the above support constraints. For example, the sample object may cover a polygon that is substantially aligned with other objects in the updated synthesized image. The parsing component 106 may further modify the sample object via trimming, inpainting and/or the like to improve the alignment with the other objects. The sample object is now modeled as the semantic segment in the scene representation of the updated synthesized image.

Rather than modeling the appearance of raw pixels in a given image, such as the query image, the modeling component 104 models the appearance of image features and indexes coordinates within the given image with q. The vector $f_q^{(l)}$ denotes a feature vector at q in the image l.

One example appearance model employs a spatial pyramid partitioning scheme for defining a model $g_{l,B}(*)$ for each pyramid sub bin B comprising the object's bounding box, which can be approximated as follows:

$$g_{l,B}(f) \propto \sum_{q \in B} f_q^{(\tilde{l}_f)} + \lambda g_{c_f}(f)$$

Referring to the above equation, $\tilde{I}_l$ denotes image pixels corresponding to the sample object to be inserted and $\tilde{B}$ denotes a sub-region of an untransformed sample image mask $\tilde{Q}_l$ such that sub bin $B=T(\tilde{B}_l, \theta_l)$. $g_{c_l}$ is a mean distribution of image features measured over all objects labeled as class c in the sample image to be synthesized with the query image.

As mentioned above, modeling the appearance of an entire image, such as the synthesized image, may be achieved using the appearance models of individual objects. Each object provides image data for those sub-regions where that object is visible. The following defines an object visibility mask $V_l$ where $L_x$ is the set of dictionary indices for objects in a scene X of the query image:

$$V_l = Q_l \setminus \cup_{\{l' \in L_x s.t. l_{l'} \geq l_l\}} Q_{l'}$$

The modeling component 104 models a likelihood of the synthesized image as the probability of each pixel in the image under the appearance model of the object whose visibility mask covers that pixel.

$$p(I \mid X) = \prod_{l \in \mathcal{L}_x} \prod_{q \in v_l \cap Q_l} g_l(f_q^{(l)})$$

Features f may include any combination of image feature types, such as discrete visual words. Each segment is assigned a unique discrete depth layer $l_l$.

As described herein, the parsing component 106 constructs a set of possible modifications (e.g., semantic changes) that move a current synthesized image toward each neighbor sample image in a scene network, for example, while preserving the current synthesized image's scene structure or while refining that scene structure using objects from structurally similar scenes. By way of example, the parsing component 106 may refine the semantic structure by recognizing objects in the query image and adding such objects to the semantic structure. In order to recombine objects into novel scenes, the parsing component 106 implements a set of non-parametric scene modification moves using the annotated image data.

According to one example implementation, the parsing component 106 performs a random walk over the scene network and an object network. The parsing component 106 may commence the walk by initializing a scene representation to a state of a random scene sampled uniformly from the annotated image data. The parsing component 106 proceeds to identify the present scene context by forming links to semantically similar neighbor scenes. The parsing component 106 may move the initialized scene representation toward one of these neighbor scenes by applying one or more scene modification moves. In order to encourage objects cover all the pixels, the parsing component 106 may interleave random walk steps with steps for choosing a valid move that produces a scene with a maximum pixel coverage.

Figure 2:
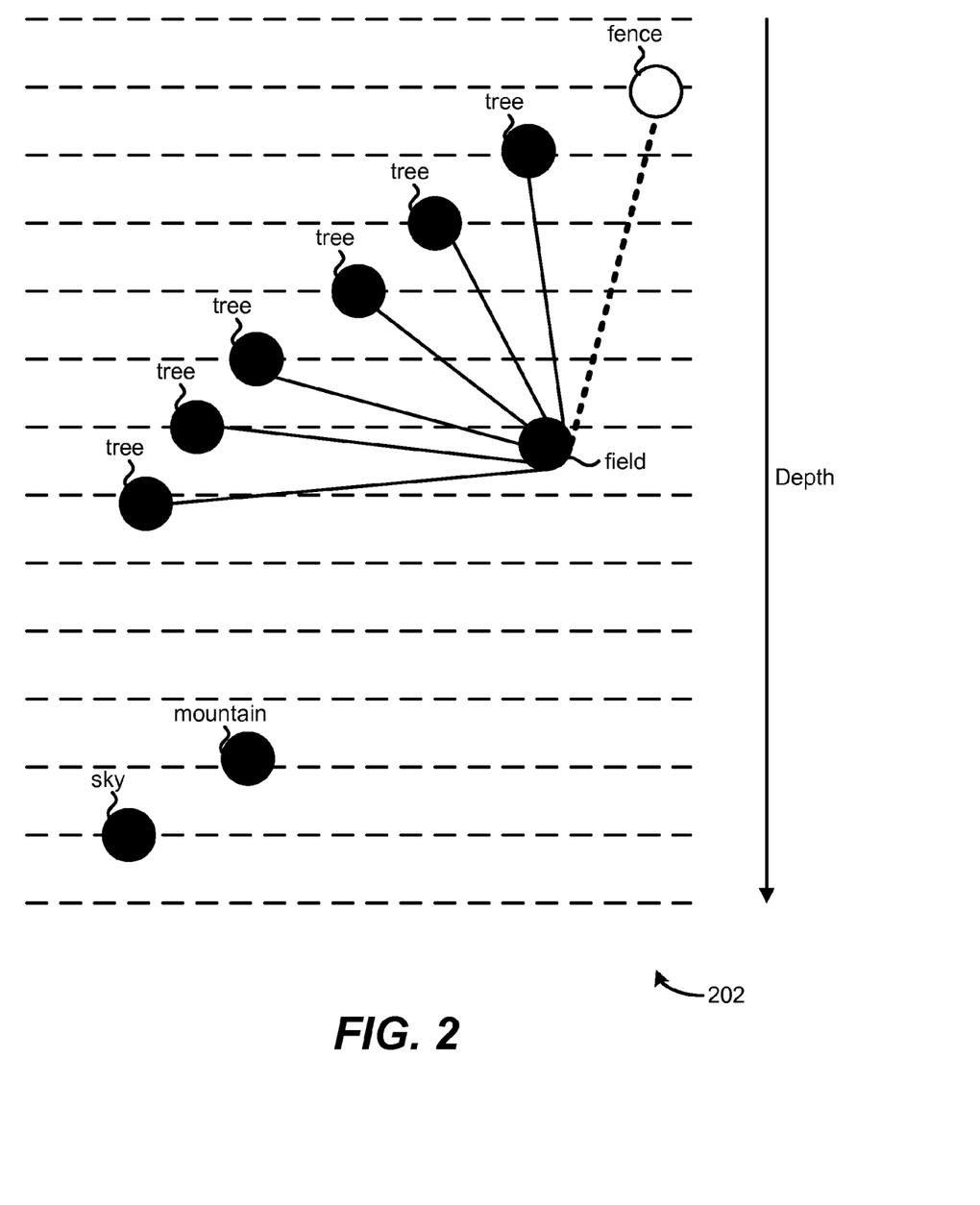
FIG. 2 is a flow diagram illustrating example steps for searching annotated image data to identify a semantic structure of a query image according to one example implementation.

FIG. 2 illustrates a scene representation of a query image according to one example implementation. The depicted scene representation may be viewed as a layered scene representation in which parallel dashed lines denote discrete depth layers for the query image's objects (e.g., query objects).

As described herein, an example scene's semantic structure can be represented as a set of objects in which each object is a transformed version of a sample object obtained from an annotated sample image and/or aligned with other objects at an appropriate depth layer. The sample object may be assigned a depth layer matching that object's depth in the sample image. Alternatively, the sample object may be translated and scaled into a different polygon and then, inserted into the scene representation at a random depth layer. Even though each and every valid transformation for modifying the sample object may not be specifically enumerated herein, it is appreciated that the technology described herein encompasses such subject matter. The scene's semantic structure includes relationships between objects, which can be represented in graphical form as a forest built from determined support constraints. As one example support constraint, if object A physically supports object B, then object B is a child of the object A.

The following description refers to a scenegraph 202 of which each circle denotes a semantic segment representing an object at a particular depth and/or context. Although the scenegraph 202 is one example of a layered representation of a scene's semantic structure, it is appreciated that the technology described herein envisions other embodiments for representing the scene's semantic structure. As depicted in FIG. 2, the scenegraph 202 represents a scene having a sky, a mountain, and a field supporting a set of trees and a fence.

According to one an example of adding an object to the scene of the scenegraph 202 illustrated by FIG. 2, an image understanding mechanism assigns the object a depth layer and adds a semantic segment modeling the object's context in the scene, including any support constraint. Consider an embodiment of the scenegraph 202 in which the fence object is a recent addition; the image understanding mechanism may select the fence object because a neighboring sample image has another fence object supported by a field object and the scenegraph 202 includes a field object capable of supporting the fence object. In order to pick a particular fence to add, the image understanding mechanism searches the object network to find a fitting fence to add.

Figure 3:
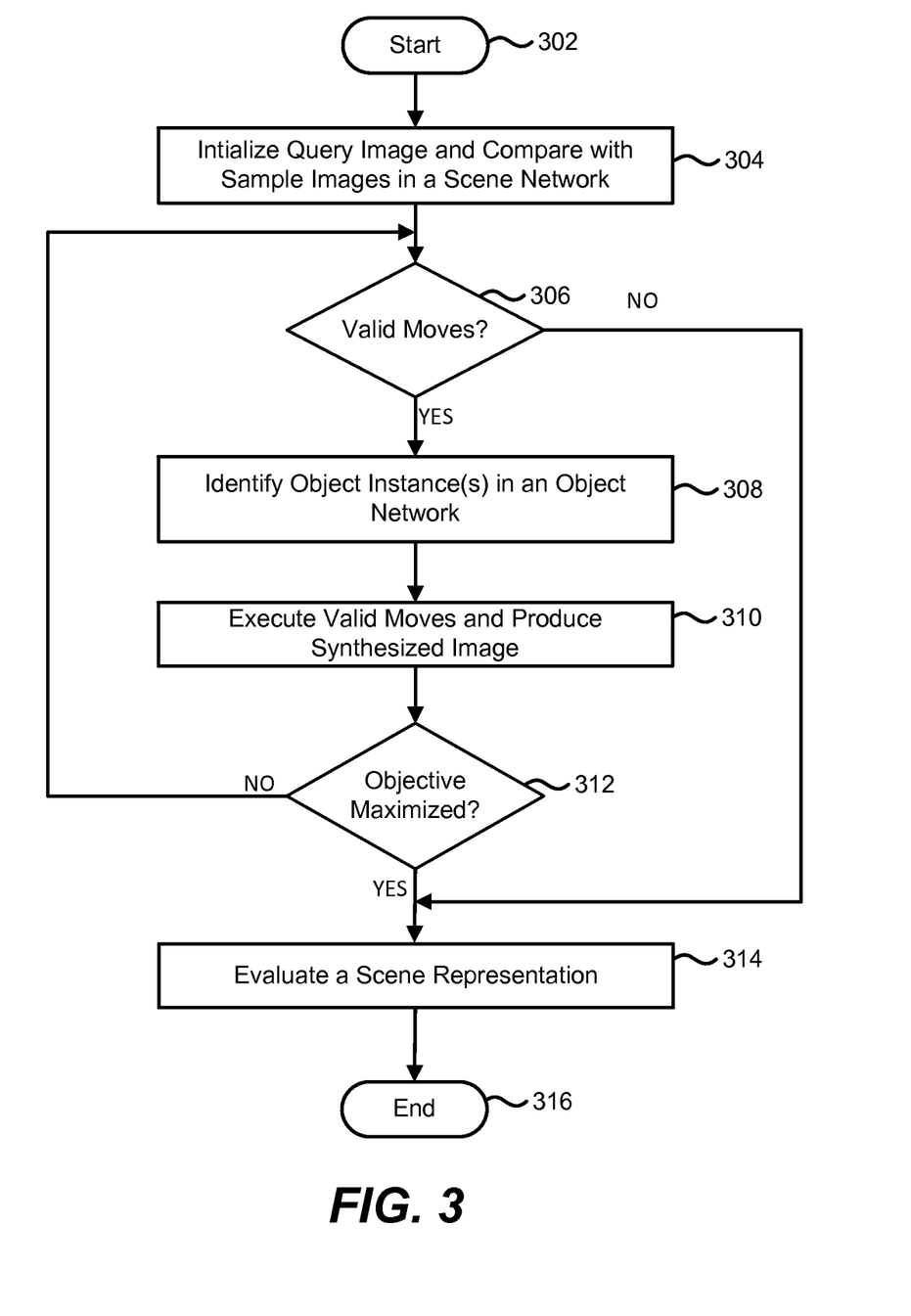
FIG. 3 is a representation of a query image's semantic structure according to one example implementation.

FIG. 3 is a flow diagram illustrating example steps for searching annotated image data to identify a semantic structure of a query image according to one example implementation. One or more components of an image understanding mechanism (e.g., the image understanding mechanism 102 of FIG. 1) may be configured to perform the example steps. Step 302 commences the example steps and proceeds to step 304 where a query image is initialized with an empty semantic structure or a semantic structure populated with objects from a random scene. The query image is compared with sample images in a scene network. Step 306 determines whether there are any valid scene modification moves for synthesizing a scene representation for the query image.

As described herein, in order to recombine sample objects into the scene representation, the image understanding mechanism executes a set of valid non-parametric scene modification moves. A first example scene modification move type includes a "birth" move type, which adds a sample object A of a sample image to the scene representation by modeling that object A as a semantic segment in relation to other objects in the scene representation. A semantic segment generally indicates geometric relationships to other objects and provides scene context to the scene representation.

In order for such a scene modification move to be valid, there may be one or more parent/sibling requirements. For example, the semantic segment's parent's class in the scene representation for a resulting synthesized image should equal a class associated with the object A's parent object in the sample image. Furthermore, a number of items located amongst the semantic segment's siblings in the scene representation that also belong to the semantic segment's class may be less than a number of items associated with the object A's class and located amongst the object A's siblings in the sample image. The image understanding mechanism, optionally, modifies image data for the object A to transform that object's appearance prior to inserting the semantic segment into the scene representation.

A "death" move type refers to another example scene modification move where an object B is removed from the scene representation assuming that the following validity rule holds true: There exists an object A in a sample image whose object class is the same as the parent of object B and which has fewer children of the object class of object B than object B's parent has children of this class. The above death validity rule ensures that performing a "death" scene modification move renders a given scene's semantic structure more similar to the scene in the sample image.

Another move type, known as a "swap" move type, represents a scene modification move configured to exchange an object B in the scene representation for an object A from the sample image. A given "swap" scene modification move is deemed valid if a "death" scene modification move for the object B and a "birth" scene modification move for the object A also constitute valid operations. As an alternative validity rule, the object A and the object B should be children of a same parent object and belong to a same class.

A "merge" move type represents yet another scene modification move embodiment. According to one example implementation, executing a merge recombination exchanges two objects B and C in the scene representation for an object A from the sample image. A valid merge scene modification move may require valid death scene modification moves for objects B and C and a valid birth scene modification move for object A.

According to one example implementation, the scene network defines a semantic space relative to the query image's objects. The image understanding mechanism may select nearby sample images within that semantic space for the purpose of scene synthesis. For instance, the image understanding mechanism may identify k-nearest neighbor sample images using histogram intersection distance on a two-level spatial pyramid of object class pixel labels. The image understanding mechanism proceeds to identify one or more valid scene modification moves that synthesize a scene more similar to the sample images. Step 306 provides the one or more valid scene modification moves to step 308 for execution. If no potential scene modification move type is valid, step 306 proceeds to step 314.

Initially, none the query image's objects, or query objects, have been recognized by the image understanding mechanism. As mentioned above, one example implementation of the initial scene representation includes a combination of random objects from the scene network. This combination may be fitted together into a semantically valid scene representation. The image understanding mechanism compares the query image with an image generated with this scene representation and determines whether any of the random objects fit into the query image in terms of visual similarity.

Step 308 searches the object network and identifies one or more corresponding objects for synthesizing the scene representation for the query image. For each object class, an object network defines a data network of object instances of the same object category to characterize the structure of similar features and/or masks. The image understanding mechanism determines whether updating the semantic structure with the object instance results in increased visual similarity and/or semantic similarity with the query image. The image understanding mechanism may use this object network to identify an object instance that fits into the query image's initial scene representation in terms of semantic similarity, such as an object often depicted without a parent object or an object without siblings. After recognizing one or more initial query objects, the image understanding mechanism uses this object network to search for an object instance corresponding to one of the query objects. By way of example, an example corresponding object instance may be visually similar to the query image's object and/or fit into the query image's scene representation. If the initial scene representation includes randomly populated objects instead of an empty semantic structure, the image understanding mechanism may identify an object instance that when added to the initial scene representation, represents an improvement in terms of visual and/or semantic similarity.

Step 310 executes the set of valid moves and produces the synthesized image. Step 312 is determination as to whether an objective has been maximized. One example objective is a percentage of pixel coverage. If, for instance, the scene representation substantially covers all pixelized regions with sample objects, the pixel coverage objective has most likely been reached. Another example objective includes visual similarity with the original query image.

The following represents one example implementation for inferring an explanation that maximizes a scene representation likelihood:

$$X = \mathrm{argmax}_x p(I \mid X)$$

In the above equation, X denotes the scene representation, I denotes the query image and probability function p( ) models a likelihood of the synthesized image as the probability of each pixel in that image under an appearance model of the object whose visibility mask covers that pixel.

The image understanding mechanism may process each scene representation generated via the example steps, such as step 304 to step 312, and select the scene representation whose synthesized image is most visually similar to the query image. If step 312 determines that the scene representation for the synthesized image maximizes the objective, step 312 proceeds to step 314. If step 312 determines that the objective is not reached, step 312 returns to step 306. Step 306 determines whether to repeat the identification and execution of valid moves unless there are no more valid moves. Step 314 terminates the example steps depicted in FIG. 3.

Figure 4A:
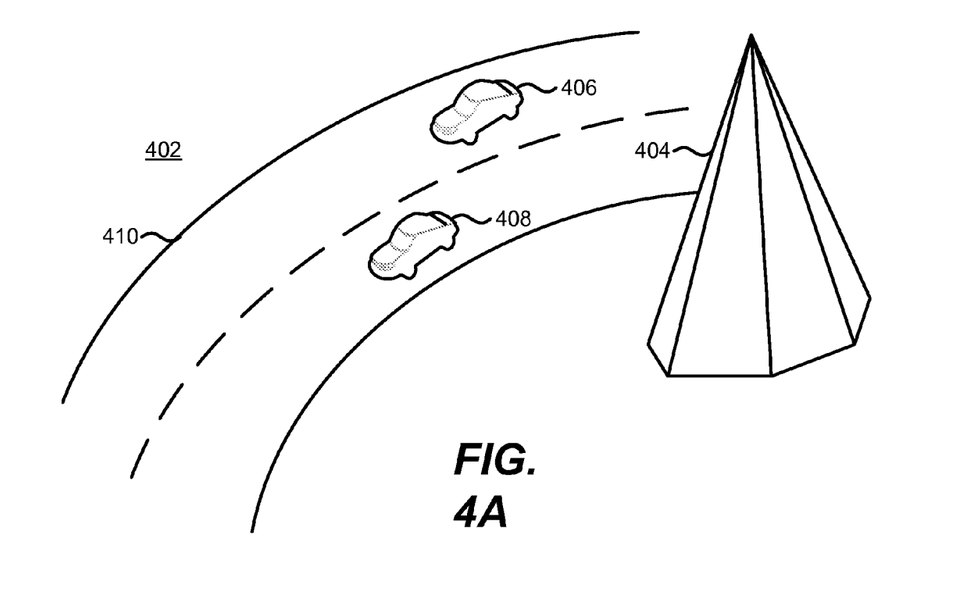
FIG. 4A illustrates an example query image and FIG. 4B illustrates an example sample image according to one example implementation.
Figure 4B:
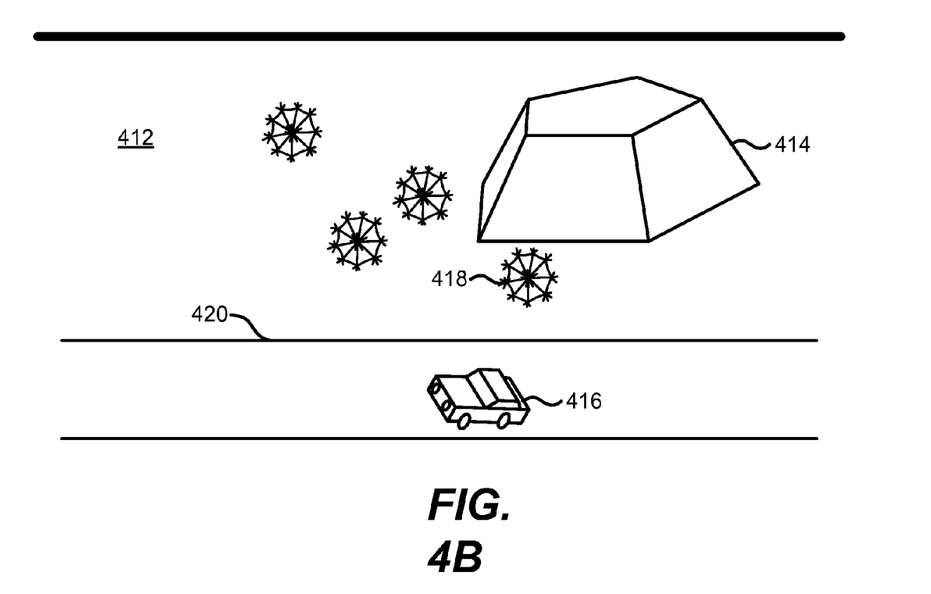

FIG. 4A illustrates an example query image and FIG. 4B illustrates an example sample image according to one example implementation. The following describes example interpolation techniques between the example query image and the example sample image.

Both images may express semantically similar scenes. As depicted, the example query image of FIG. 4A illustrates a scene 402 comprising a set of objects that include a mountain 404, a car 406, a car 408 and a road 410. These objects are modeled by appearance in a scene representation, including support constraints between the road 410 and both the car 406 and the car 408. One example explanation for the scene 402 depicted in FIG. 4A is that the car 406 is on the road 410. The mountain 404 occludes a portion of the road 410.

The example sample image (FIG. 4B) includes a scene 412 that illustrates a set of sample objects, including a mountain 414, a car 416, a desert 418 and a road 420. The car 416 is supported by the road 420 and the mountain 414 is supported by the desert 418. One example implementation may generate the scene 402 (e.g., FIG. 4A) by combining/transforming objects selected from the scene 412 (e.g., FIG. 4B) and/or other scenes in the scene network. Hence, the scene 402 of FIG. 2A may be referred to as a synthesized scene. One example image understanding mechanism, as described herein, includes a parsing component for synthesizing scenes by searching over annotated image data modeling sample scenes and sample objects.

FIG. 4B depicts a sample image selected from annotated image data, such as a data network comprising semantically similar scenes. This data network may be referred to as a scene network. Within the scene network, the scene 412 represents a nearest scene to the scene 402 of FIG. 4A based upon scene context. For example, the scene 412 may be considered semantically similar because, like the scene 402, the scene 412 includes a car supported by a road.

Performing one or more scene modification moves, as well as other transformations, modifies the scene 402 into a synthesized scene that more closely resembles the scene 412. For example, the image understanding mechanism may change the scene 402 by removing the car 406. As an alternative, the image understanding mechanism may swap the car 416 for the car 406 and the car 408 in the scene 402. It is appreciated that other valid scene modification moves may render the updated scene 402 more similar to the scene 412. To illustrate, the mountain 404 of FIG. 4A may be exchanged for the mountain 414 of the scene 412 of FIG. 4B. The mountain 414 may be trimmed and/or inpainted to closely match the mountain 404.

After translating and/or scaling the road 420, the image understanding mechanism may exchange the road 410 with the transformed road 420. The transformed road 420 replaces the road 410 at that road's coordinates. As an option, the image understanding mechanism may change a depth layer of the transformed road 420 to match the depth of the road 410. Accordingly, the transformed road 420 is positioned in a same sub-region as the road 410.

Figure 5:
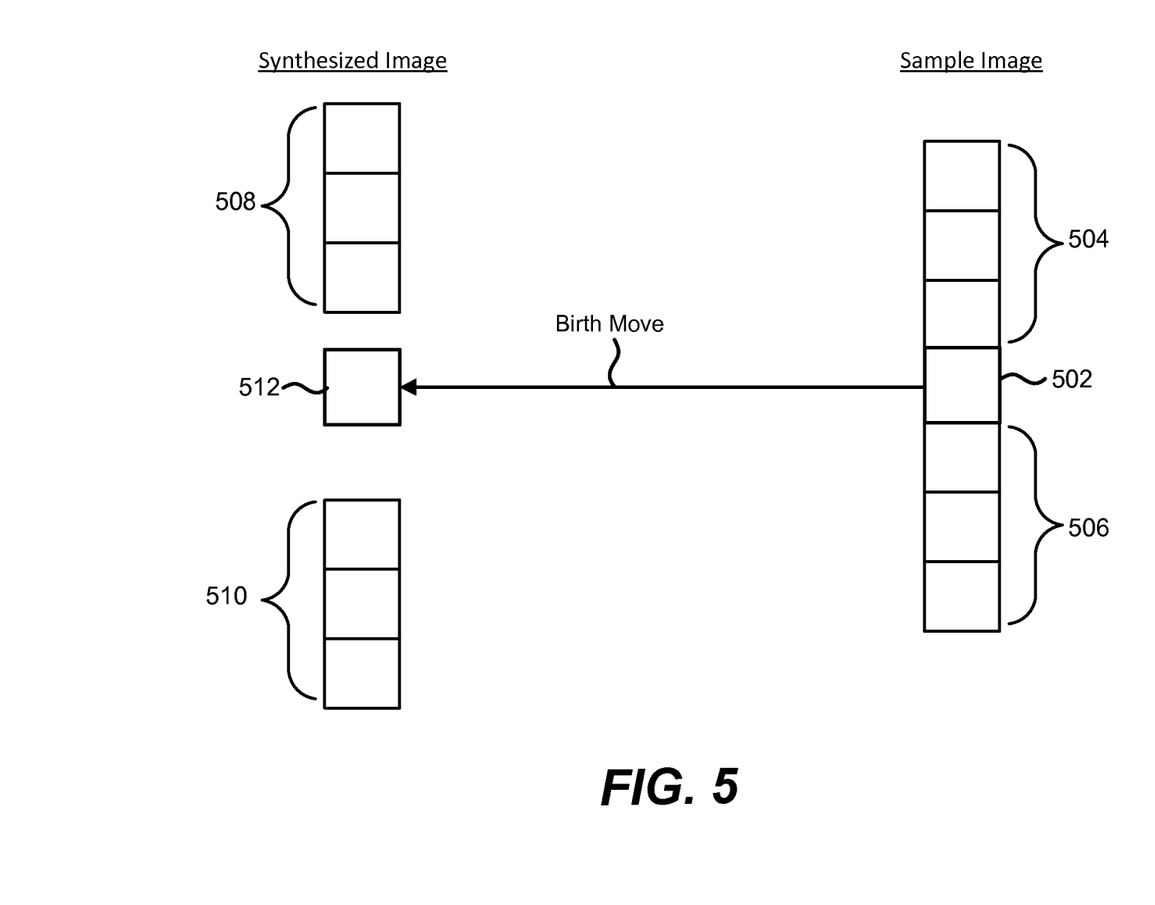
FIG. 5 illustrates a depth layer assignment between a sample image and a synthesized image according to one example implementation.

FIG. 5 illustrates a depth layer assignment between a sample image and a synthesized image according to one example implementation. Each stacked block represents a discrete depth layer comprising one or more objects of different classes.

When an object in a depth layer 502 is added to the synthesized image, a corresponding depth layer is determined by matching a distribution 504 of objects above and a distribution 506 of objects below the depth layer 502 with two distributions from the synthesized image. Each distribution may refer to a histogram of object classes occupying at least three depth layers. By identifying a distribution 508 and a distribution 510 that best matches the distribution 504 and the distribution 506, respectively, a depth layer 512 located between both distributions may be selected and assigned to the object in the depth layer 502. An image feature distribution for the object is combined with other object models in the depth layer 512.

Figure 6:
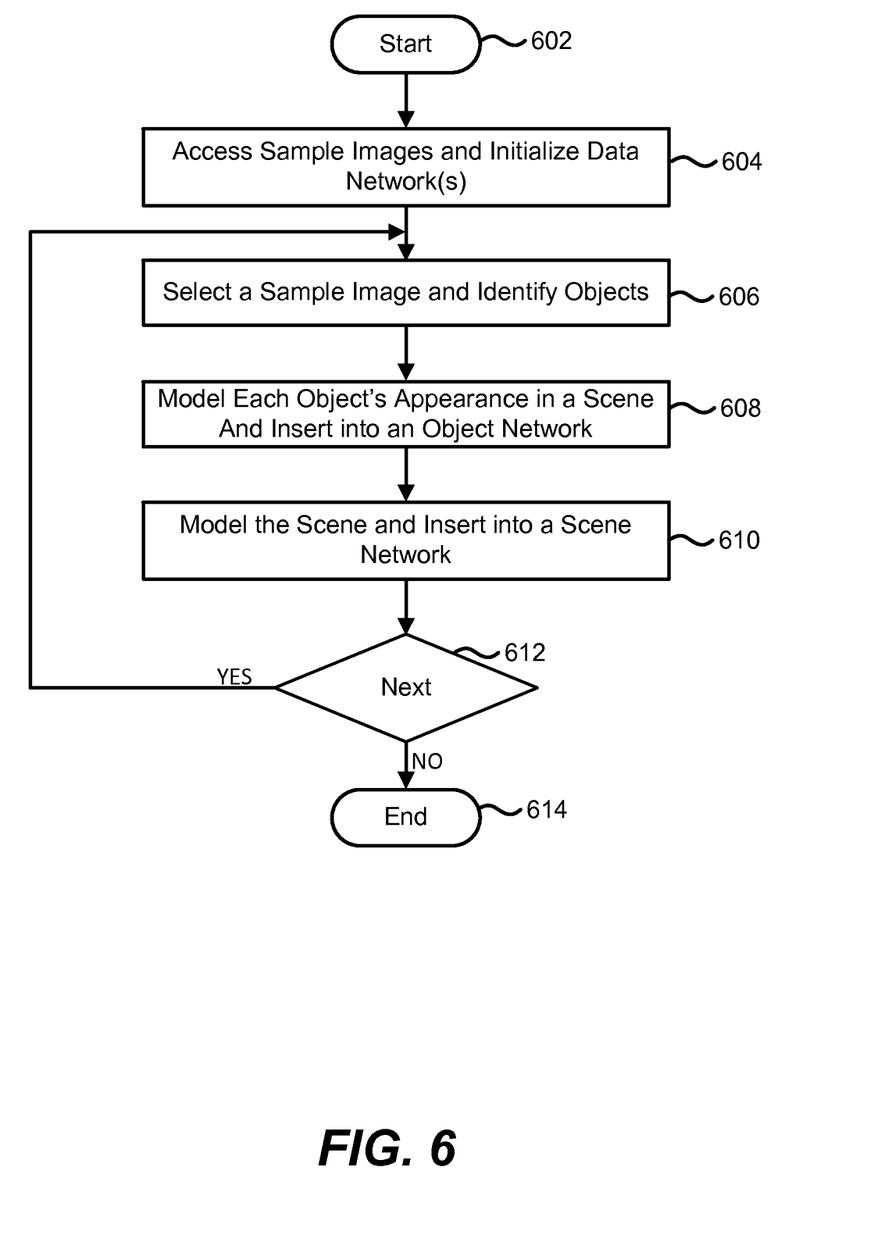
FIG. 6 is a flow diagram illustrating example steps for modeling sample images according to one example implementation.

FIG. 6 is a flow diagram illustrating example steps for modeling sample images according to one example implementation. One or more components of an image understanding mechanism (e.g., the image understanding mechanism 102 of FIG. 1) may be configured to perform the example steps. Step 602 commences the example steps and proceeds to step 604 where sample images, possibly modeled as data networks, are accessed.

Step 606 selects a sample image and identifies polygons as potential objects. Step 608 models each object's appearance in the sample image's scene and inserts each object model into an object network. One example object model includes an image feature distribution for a sample image sub-region comprising an object. Step 610 models the scene and inserts the scene model into a scene network. Step 610 may generate the scene model by combining each object model within the sample image. Step 612 determines whether to generate annotated image data for a next sample image. If there are more sample images to be modeled, step 612 returns to step 606. If there are no more sample images, step 612 proceeds to step 614. Step 614 terminates the example steps of FIG. 6. Using the technology described above, the annotated image data provided herein can be compared with a query image and used to generate a layered scene representation corresponding to that query image's semantic structure.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 7:
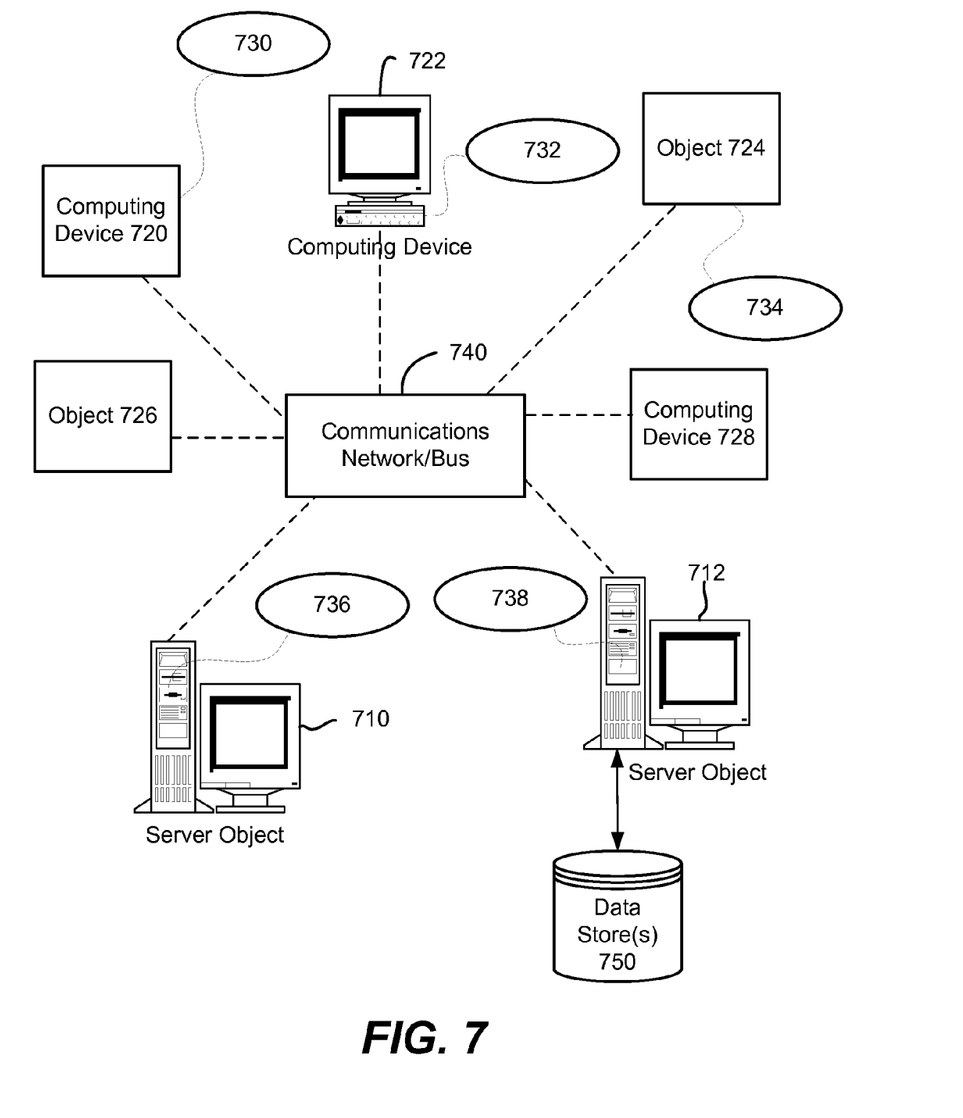
FIG. 7 is a block diagram representing example non-limiting networked environments in which various embodiments described herein can be implemented.

FIG. 7 provides a schematic diagram of an example networked or distributed computing environment. The distributed computing environment comprises computing objects 710, 712, etc., and computing objects or devices 720, 722, 724, 726, 728, etc., which may include programs, methods, data stores, programmable logic, etc. as represented by example applications 730, 732, 734, 736, 738. It can be appreciated that computing objects 710, 712, etc. and computing objects or devices 720, 722, 724, 726, 728, etc. may comprise different devices, such as personal digital assistants (PDAs), audio/video devices, mobile phones, MP3 players, personal computers, laptops, etc.

Each computing object 710, 712, etc. and computing objects or devices 720, 722, 724, 726, 728, etc. can communicate with one or more other computing objects 710, 712, etc. and computing objects or devices 720, 722, 724, 726, 728, etc. by way of the communications network 740, either directly or indirectly. Even though illustrated as a single element in FIG. 7, communications network 740 may comprise other computing objects and computing devices that provide services to the system of FIG. 7, and/or may represent multiple interconnected networks, which are not shown. Each computing object 710, 712, etc. or computing object or device 720, 722, 724, 726, 728, etc. can also contain an application, such as applications 730, 732, 734, 736, 738, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 7, as a non-limiting example, computing objects or devices 720, 722, 724, 726, 728, etc. can be thought of as clients and computing objects 710, 712, etc. can be thought of as servers where computing objects 710, 712, etc., acting as servers provide data services, such as receiving data from client computing objects or devices 720, 722, 724, 726, 728, etc., storing of data, processing of data, transmitting data to client computing objects or devices 720, 722, 724, 726, 728, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 740 or bus is the Internet, for example, the computing objects 710, 712, etc. can be Web servers with which other computing objects or devices 720, 722, 724, 726, 728, etc. communicate via any of a number of known protocols, such as the hypertext transfer protocol (HTTP). Computing objects 710, 712, etc. acting as servers may also serve as clients, e.g., computing objects or devices 720, 722, 724, 726, 728, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 8 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 8:
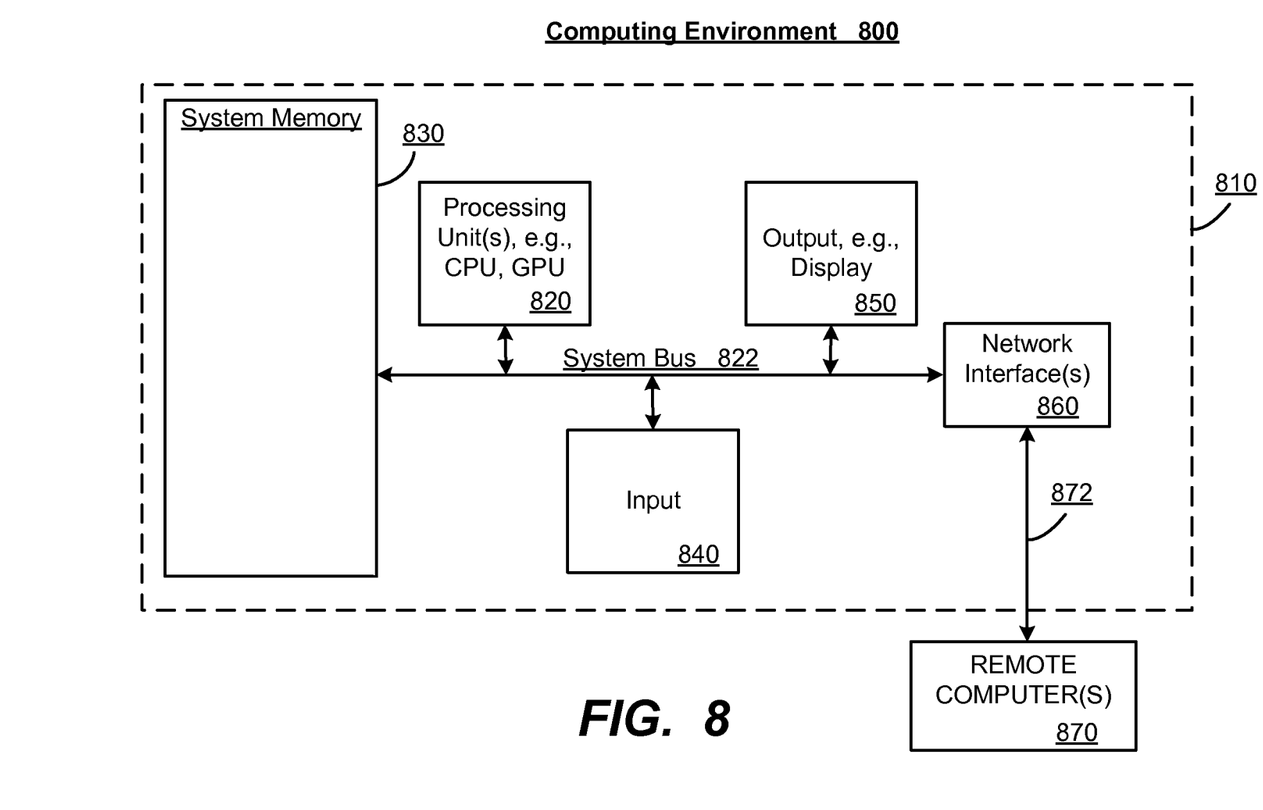
FIG. 8 is a block diagram representing an example non-limiting computing system or operating environment in which one or more aspects of various embodiments described herein can be implemented.

FIG. 8 thus illustrates an example of a suitable computing system environment 800 in which one or aspects of the embodiments described herein can be implemented, although as made clear above, the computing system environment 800 is only one example of a suitable computing environment and is not intended to suggest any limitation as to scope of use or functionality. In addition, the computing system environment 800 is not intended to be interpreted as having any dependency relating to any one or combination of components illustrated in the example computing system environment 800.

With reference to FIG. 8, an example remote device for implementing one or more embodiments includes a general purpose computing device in the form of a computer 810. Components of computer 810 may include, but are not limited to, a processing unit 820, a system memory 830, and a system bus 822 that couples various system components including the system memory to the processing unit 820.

Computer 810 typically includes a variety of computer readable media and can be any available media that can be accessed by computer 810. The system memory 830 may include computer storage media in the form of volatile and/or nonvolatile memory such as read only memory (ROM) and/or random access memory (RAM). By way of example, and not limitation, system memory 830 may also include an operating system, application programs, other program modules, and program data.

A user can enter commands and information into the computer 810 through input devices 840. A monitor or other type of display device is also connected to the system bus 822 via an interface, such as output interface 850. In addition to a monitor, computers can also include other peripheral output devices such as speakers and a printer, which may be connected through output interface 850.

The computer 810 may operate in a networked or distributed environment using logical connections to one or more other remote computers, such as remote computer 870. The remote computer 870 may be a personal computer, a server, a router, a network PC, a peer device or other common network node, or any other remote media consumption or transmission device, and may include any or all of the elements described above relative to the computer 810. The logical connections depicted in FIG. 8 include a network 872, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising:
generating, by an image understanding mechanism implemented on the at least one processor, a scene representation for a query image, including:
searching scenes corresponding to a set of sample images to identify one or more objects from one or more of the set of sample images for comparing with a scene expressed by the query image; and
transforming the query image and the one or more objects into semantic segments comprising at least a portion of the scene representation, wherein the semantic segments provide a set of relationships between the one or more objects and between the one or more objects and the scene expressed by the query image, including relative depth between the one or more objects and a depth layer or position at which at least one object is inserted into the scene expressed by the query image, wherein transforming the query image and the one or more objects further comprises:
generating a synthesized image using the one or more objects, the depth layer of the at least one inserted object in the synthesized image determined by using the semantic segments and relative depth information to match a depth distribution of objects in layers above and below the at least one inserted object in a corresponding sample image to the depth distribution of objects in layers above and below the at least one inserted object in the synthesized image.

2. The method of claim 1, wherein transforming the query image and the one or more objects further comprises estimating support constraints between the one or more objects, and assigning a depth layer to individual objects of the one or more objects.

3. The method of claim 1, wherein transforming the query image and the one or more objects further comprises fitting the one or more objects into the scene representation of the query image to recognize at least one query object.

4. The method of claim 1, wherein transforming the query image and the one or more objects using the one or more objects to produce the synthesized image further comprises combining an image feature distribution for the at least one inserted object with other object models in the depth layer.

5. The method of claim 4 further comprising updating the scene representation to correspond to a semantic structure of the synthesized image.

6. The method of claim 1, wherein transforming the query image and the one or more objects further comprises replacing the at least one object with at least one scene preserving object.

7. The method of claim 1, wherein transforming the query image and the one or more objects further comprises removing the at least one object from the query image.

8. The method of claim 1, wherein transforming the query image and the one or more objects further comprises modifying an object prior to or subsequent to inserting the object into the query image.

9. The method of claim 1, wherein transforming the query image and the one or more objects further comprises performing at least one of translating, scaling or changing a depth layer of an object of the one or more objects.

10. The method of claim 1, wherein transforming the query image and the one or more objects further comprises performing at least one trimming or inpainting an object of the one or more objects.

11. In a computing environment, a system, comprising:
at least one processor; and
an image understanding mechanism implemented on the at least one processor and configured to:
compare a query image with annotated image data associated with sample images to identify a set of valid moves toward at least one sample image that comprises at least one of a scene modification or a transformation, the set of valid moves based upon support constraints of a semantic structure of objects;
execute the set of valid moves to interpolate a synthesized image from the query image and corresponding objects from the annotated image data, including determining a depth layer of at least one inserted object in the synthesized image by using the semantic segments and relative depth information to match a depth distribution of objects in layers above and below the at least one inserted object in the at least one sample image to the depth distribution of objects in layers above and below the at least one inserted object in the synthesized image; and
determine whether the synthesized image maximizes an objective corresponding to the query image.

12. The system of claim 11, wherein the image understanding mechanism comprises a parsing component configured to parse the query image into a layered scene representation based upon the semantic structure of objects in the synthesized image.

13. The system of claim 12, wherein the parsing component is further configured to determine whether the layered scene representation generates the query image.

14. The system of claim 12, wherein the component is further configured to add an object to the layered scene representation or remove an object from the layered scene representation.

15. The system of claim 12, wherein the component is further configured to exchange at least one object in the layered scene representation for at least one object from the sample images.

16. The system of claim 12, wherein the parsing component is further configured to search a scene network to identify a semantically similar scene.

17. The system of claim 16, wherein the parsing component is further configured to identify an object based upon the semantically similar scene, and search an object network to identify a valid object in a same class.

18. The system of claim 17, wherein the parsing component is further configured to select the valid object having a maximum pixel coverage in the query image.

19. One or more computer storage devices having computer-executable instructions, which on execution by a computer, cause the computer to perform operations, comprising:
an image understanding mechanism initializing a query image representing a scene;
the image understanding mechanism searching a set of scenes corresponding to a set of sample images in a scene network to identify one or more objects from the set of sample images for comparing with the scene represented by the query image; and
the image understanding mechanism determining whether there are one or more valid scene modification moves for synthesizing a scene representation for the query image, including by transforming the query image and the one or more objects into semantic segments comprising at least a portion of the scene representation to recombine the one or more objects into the scene representation as a synthesized image, including determining a depth layer of at least one inserted object in the synthesized image by using the semantic segments and relative depth information to match a depth distribution of objects in layers above and below the at least one inserted object in a corresponding sample image to the depth distribution of objects in layers above and below the at least one inserted object in the synthesized image.

20. The one or more computer storage devices of claim 19 wherein the one or more valid scene modification moves includes at least one of a birth move, a death move, a swap move, or a merge move.

* * * * *